United States Patent [19]

Becker et al.

[11] Patent Number: 5,148,909
[45] Date of Patent: Sep. 22, 1992

[54] ROLLER CONVEYOR TRAIN

[75] Inventors: Klaus Becker; Rüdiger Ostholt, both of Wetter, Fed. Rep. of Germany

[73] Assignee: Mannesmann Aktiengesellschaft, Düsseldorf, Fed. Rep. of Germany

[21] Appl. No.: 399,165

[22] Filed: Aug. 28, 1989

[51] Int. Cl.⁵ ............................................ B65G 13/02
[52] U.S. Cl. .................................... 198/780; 198/790
[58] Field of Search ....................... 198/780, 781, 790; 193/37

[56] References Cited

U.S. PATENT DOCUMENTS

| | | | |
|---|---|---|---|
| 3,994,380 | 11/1976 | Hope et al. | 193/37 |
| 4,059,180 | 11/1977 | Krivec et al. | 193/37 |
| 4,148,386 | 4/1979 | Bradbury | 193/37 |
| 4,181,217 | 1/1980 | Hüls et al. | 198/842 |
| 4,221,288 | 9/1980 | Rae | 198/781 |
| 4,311,242 | 1/1982 | Hnatko | 198/790 X |
| 4,343,396 | 8/1982 | George | 198/790 X |
| 4,421,224 | 12/1983 | Dingman | 198/781 |
| 4,605,120 | 8/1986 | Vanderline et al. | 198/781 |
| 4,606,659 | 8/1986 | Hogan | 193/37 X |
| 4,798,282 | 1/1989 | Sperduti et al. | 198/781 |

FOREIGN PATENT DOCUMENTS

3345368C2  6/1985  Fed. Rep. of Germany .
3101355C2  1/1986  Fed. Rep. of Germany .
3540405A1  5/1987  Fed. Rep. of Germany .
1198319   12/1959  France .

Primary Examiner—D. Glenn Dayoan
Attorney, Agent, or Firm—Horst M. Kasper

[57] ABSTRACT

A roller conveyor train is disclosed with support rollers including a support roller having a first axial end and a second axial end, a first axle aligned with an axis for supporting a first bearing, a second axle aligned with the axis for supporting a second bearing. The first bearing is inserted and placed at the first axial end of the support roller. The second bearing is inserted and placed at the second axial end of the support roller. A first bearing is inserted and placed at the first axial end of the support roller. A second bearing is inserted and placed at the second axial end of the support roller. A first side cheek of the roller conveyor train has a support plate disposed inside of the first side cheek. The support plate is attached from the outside to the first side cheek. The first side cheek rests on the support plate attached from the outside and supports the first axle for the roller to run on. The support roller protrudes with its first axial end through a first receiver openings in a web of the first side cheek. The first axle rests disengagable on the first side cheek.

50 Claims, 5 Drawing Sheets

Fig.14 ated 5,148,909

ROLLER CONVEYOR TRAIN

BACKGROUND OF THE INVENTION

1. Field of the Invention

The invention relates to a roller conveyor train with support rollers, which are supported by bearings and axles employed at the ends of the support rollers and axles at side cheeks of the roller conveyor train.

2. Brief Description of the Background of the Invention Including Prior Art

The support rollers are held on two ends by way of screws running through the side walls according to a roller conveyor train taught in to the German Patent DE-PS 33 45 368. Upon placing of the screws, the support rollers have to be in a proper position. The mounting is made unnecessarily difficult by this construction and a roller conveyor train becomes correspondingly expensive. In addition, for changing of individual support rollers, always two screws have to be unscrewed or unbolted and the support rollers have to be held in position the same time.

The French Patent, FR-PS 11 98 319 teaches a roller conveyor train, where the axles are offset at their ends. The side cheeks in each case comprise two parts, where the one part exhibits circular bore holes for the axles, while the other part includes a straight upper edge and thus is connected to the first part by way of screws or bolts, such that a part of the circular bore corresponding to the axle offset is covered by the upper edge of the second part, such that the axles are retained and supported non-rotatable in the side cheeks. For putting on the rollers, the two screws holding the side cheeks together have to be unscrewed or unbolted.

SUMMARY OF THE INVENTION

Purposes of the Invention

It is an object of the invention to furnish a simpler and less expensive roller conveyor train, where support rollers are to be demountable from one side and in a horizontal direction.

It is another object of the present invention to provide a roller conveyor train where the axles are held by a simple clamping mechanism.

It is yet a further object of the present invention to provide a roller conveyor train which is safe and adapted to easy maintenance.

Brief Description of the Invention

According to the invention, a roller conveyor train with support rollers comprises a support roller having a first axial end and a second axial end, a first axle aligned with an axis for supporting a first bearing. A second axle is aligned with the axis for supporting a second bearing. A first bearing is inserted and placed at the first axial end of the support roller. A second bearing is inserted and placed at the second axial end of the support roller. A first bearing is inserted and placed at the first axial end of the support roller. A second bearing is inserted and placed at the second axial end of the support roller. A first side cheek of the roller conveyor train has a support plate disposed inside of the first side cheek, but attached from the outside to the first side cheek. The first side cheek rests on the support plate attached from the outside and supports the first axle for the roller to run on. The support roller protrudes with its first axial end through a first receiver opening in a web of the first side cheek and the first axle rests disengagable on the first side cheek. A second side cheek of the roller conveyor train supports the second axle for the roller to run on. The support roller protrudes with its second axial end through a second receiver opening in a web of the second side cheek such that the second axial end of the support roller is supported via the second axle attached to the second side cheek.

The roller conveyor train according to the invention wherein the first side cheek is furnished with a U-profile and the web of the first side cheek can be disposed in a direction toward the support roller. The roller conveyor train according to the invention can further comprise an attachment element, a first cover plate attached to the first axle, a neighboring first axle. A neighboring first cover plate can be attached to the neighboring first axle. The first cover plate and the neighboring first cover plate can be joining each other in a center area of the attachment element. The support plate can be formed as a cover plate, which cover plate can support two angle legs, which two angle legs are supported at flanges of the U-profile of the first side cheek by a clamping function. Drive gear wheels can be attached at the ends of the support roller protruding through the opening of the first side cheek for engaging pull means, an attachment element, and a distance spacer piece. The support plate can be connected by way of the attachment element and the distance spacer to the side cheek.

The distance spacer pieces can be tubular pieces. The distance spacer pieces can be made of plastic. The distance spacer pieces can include a threaded insert. The support plate and the neighboring support plate can cover each other substantially in the middle of the attachment element. The first side cheek can be furnished with a bore hole for the attachment element between the receiver opening for the support rollers. The bore hole can be employed for attachment of a reinforcement console plate, The reinforcement console plate is furnished with a slot for the attachment element reaching up to an upper edge of the reinforcement console plate.

A support for the roller conveyor train can be attached at the reinforcement console plate. A drive motor for the support roller can be attached at the reinforcement console plate. A gear wheel can be attached to the support roller. A drive gear wheel can be attached to the drive motor. A drive pull means can provide engagement from the drive gear wheel via the gear wheel to the first support roller. According to a further aspect of the invention, a drive transmission pull means is employed. A gear wheel is attached to the support roller. A neighboring gear wheel is attached to a neighboring support roller. The gear wheel of the support roller and the neighboring gear wheel of the neighboring support roller are disposed next to each other and can be connected via the drive transmission pull means to each other.

The second axle of the support roller is preferably furnished as an axle journal and can be attached at the second side cheek. The second axle of the support roller is preferably furnished as an axle journal and can be attached at the support plate. The second axle of the support roller is preferably furnished as an axle journal and can be attached at the or the cover plate. An expanding element can be employed in a second axial end of the support roller.

A spreader thrust piece can be attachable to the support roller. A locking attachment element wherein the expanding element can include a spreader piece made of a plastically deformable material. The spreader piece can be deformed directly by the spreader thrust piece with the locking attachment element. The spreader piece can be furnished with slots at an end protruding into the support roller. The spreader piece can be furnished with inclined thrust faces for the spreader thrust piece. The expanding element can include a spreader piece for a spreader collar which expanding element can be tensioned between a thrust face of the spreader piece and a thrust face of a spreader thrust piece by way of a locking attachment element. The thrust face of the spreader piece and the thrust face of the spreader thrust piece can be formed as inclined faces. The spreader collar can be slotted in longitudinal direction. The spreader collar can be furnished alternatingly with slots starting at the two axial ends of the spreader collar, which reach up to a short connecting web. The spreader collar can be furnished with a passage slot extending over a full axial length of the spreader collar. The spreader collar can be produced out of a plastically deformable material. The plastically deformable spreader collar and a second spreader collar, which can be produced of a plastically deformable material, can be disposed successively behind each other on the spreader piece. An intermediate ring can be disposed between the two plastically deformable spreader collars.

During the mounting, the support rollers are slipped simply through the receiving openings and are supported with the ends past through at the opposite side cheek. Then, the support plate, which can be simultaneously a cover plate and which is supported with angle legs at the U-shaped side cheek, is attached to the side cheek and simultaneously the support roller is supported at the side cheek. Furthermore, the exchange of individual support rollers is simple, since after the removal of the support plate or, respectively of the cover plate, the support roller to be exchanged can be pulled through the receiver opening of the side cheek. Simultaneously, the drive is interrupted and the roller conveyor train is stopped. The construction according to the invention is particularly advantageous, if the support rollers are furnished with drive gear wheels for pulling means at the ends reaching through the receiver opening. The drive protected by the cover plate prevents a dangerous engagement and accessing between pulling means and the drive gear wheels and reduces thus the development of noise associated with the drive to a substantial degree. The construction of the drive gear wheels requires a distance between the web of the side cheek and the support plate. This distance is bridged by distance spacers, which distance spacers are attached by way of screws or bolts at the side cheek. Advantageously, each support plate is furnished for only a single support roller and reaches through the inclined disposition up to the neighboring support plates. The distance spacer pieces can be tubes made of plastic. The support plate can be formed as a cover plate, which cover plate joins to another cover plate centered relative to a screw or bolt. The side cheek is formed preferably as a U-shaped profile, where the web of side cheek is turned toward the support roller. The flange of the U-profile is formed for clamping-on the cover plate with its angle legs. The side cheek is thereby formed into a closed nearly torsion-stiff box profile. The recited bore holes for the distance spacer pieces are also suitable for application of reinforcement console plates for the support of the roller train or for hanging a drive motor. The reinforcement console plates can have slots for the screws reaching up to the upper edge. The screws or bolts have to be released or unscrewed for offsetting of the supports, while the support rollers are supported further by the screws or bolts. A pulling means is guided from the drive gear wheel of the drive motor via the two gear wheels disposed above of the support rollers. In each case, two support rollers disposed next to each other are connected to each other via drive transmission pull means, where the support rollers always carry two gear wheels.

The attachement and thus also the structural environment of the support rollers in the side cheeks of the roller conveyor train can be simplified by employing at the ends of the support rollers expansion elements. The support rollers themselves can be produced out of very economic inprecise tubes and do not have to be flanged at the ends as is required in support rollers of supporting of the bearings in conventional construction. Each company representation or the customer him-or herself can saw off the support rollers off a commercial tube, which doesn't have to be a precision tube, at the desired length and does not have to rely on a certain standard length of roller train producers. The kind of the pulling means can be changed by exchange of expansion elements, for example, from chains to drive transmission belts. A spreader piece of the expanding element can be made of plastically deformable, material, for example of thermoplast and can be deformed directly into a spreader piece. It can also be furnished with a slot at the end protruding into the support roller. The pressure faces of the spreader thrust piece for expanding of this spreader piece can be disposed inclined or, respectively, conically. The expanding element can also include a spreader piece for a spreader collar, which spreader collar is tensioned between a thrust face of the spreader piece and a thrust face of a spreader thrust piece by way of a clamping screw. The thrust face is pressed upon tensioning of the locking screw against the wall of the support roller.

In order to allow this, the clamping screw or locking screw can be slotted in longitudinal direction and can in addition alternatingly have slots starting on both sides, which reach up to a short connection web remaining between the individual segments. The spreader collar can also be made of a plastically deformable material, where two spreader collars are disposed successively behind each other, and where an intermediate ring is present between the spreader collars, such that the spreader piece is well supported at two ends in the support roller.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENTS

A roller conveyor train can comprise support rollers 5. Bearings 16 are inserted and placed at the ends of the support rollers. The bearings 16 run on axles 17, which axles 17 are supported at the side cheeks 3 of the roller run-on axles. The run-on axes are supported at the side cheeks 3 of the roller conveyor train. The support rollers 5 protrude with one end through the receiver openings 3b in web 3a of the side cheek 3. The axle 17b is disengagable on the side cheek 3 and rests on the support plates 22 attached from the outside, while the support rollers 5 are supported at the other end via axle journal 17 at the coordinated side cheek 3. The side cheek 3 can be furnished with a U-profile. The web 3a of the side cheek 2 can be disposed in a direction toward the support rollers 5. The support plate 22 can in certain cases perform the function of a cover plate such as the cover plate 24 of FIG. 1. The cover plates preferably include angle legs 24a, 24b. The angle legs 24a, 24b can be supported at flanges of the U-profile of the side cheek 3 by a clamping function.

Support rollers 5 are preferably furnished with drive gear wheels 6 for transmission pull means 7, 8 at the ends of the support rollers, protruding through the receiver openings 3b. The support plates 22 can be interconnected by way of bolts 23 and distance spacers 21 to the side cheek 3. The distance spacer pieces can be tubular pieces 21a. The distance spacer pieces 21a can be made of plastic. The distance spacer pieces 21a can include a threaded insert. The side cheek 3 is preferably furnished with bore holes 3c for the screws or attachment elements 23 between the receiver opening 3b for the support rollers 5. The support plates 22 can in part overlap in the middle of the screws or attachment elements 23. The bore holes 3c can be employed for attachment of reinforcement console plates 2. The reinforcement console plates 2 can be furnished with slots 2a for the screws 23 reaching up to the upper reinforcement edge. The supports 1 of the roller conveyor train can be attached at the reinforcement console plates 2. A drive motor 9 for the support rollers 5 can be attached at the reinforcement console plate 2. A drive pull means 8 of the transmission pull means can be guided from a drive gear wheel 10 of a drive motor 9 via the two above disposed gear wheels 6 to the support rollers 5. The gear wheels 6 of two support rollers 5 can be disposed next to each other and connected via a drive transmission pull means 7 to each other. The axle journal 17 of the support rollers 5 can be furnished as axle journals and can be attached at the side cheek (3') or, respectively at the support plates (22) or the cover plates (24). The expanding elements 11 can be employed in the ends of the support rollers 5. An expanding element 11 can include a spreader piece 12 made of a plastically deformable material or of a thermoplastic material and can be deformed directly by spreader piece 12 with a locking screw or bolt 15. The spreader piece 12 can be furnished with slots at an end protruding into the support roller 5. The spreader piece 12 can be furnished with inclined thrust faces 12a for the spreader thrust piece 13. The expanding element 11 includes a spreader piece 12 for a spreader collar 14. The expanding element can be tensioned between a thrust face 12a of the spreader piece 12 and a thrust face 13a of a spreader thrust piece 13 by way of a locking screw or bolt 15. The thrust faces 12a, 13a can be formed as inclined faces and the spreader collar 14 can be slotted in longitudinal direction. The spreader collar 14 can be furnished alternatingly with slots 14a starting at the two ends, which reach up to a short connecting web 14c. The spreader collar 14 can be furnished with a passage slot extending over a full length of the spreader collar. The spreader collar 14 can be produced out of a plastically deformable material. According to the embodiment of FIG. 6, two plastically deformable spreader collars 14 can be disposed successively behind each other on spreader piece 12. An intermediate ring 25 can be disposed between the two plastically deformable spreader collars 14.

Figures 1, 2, 6:
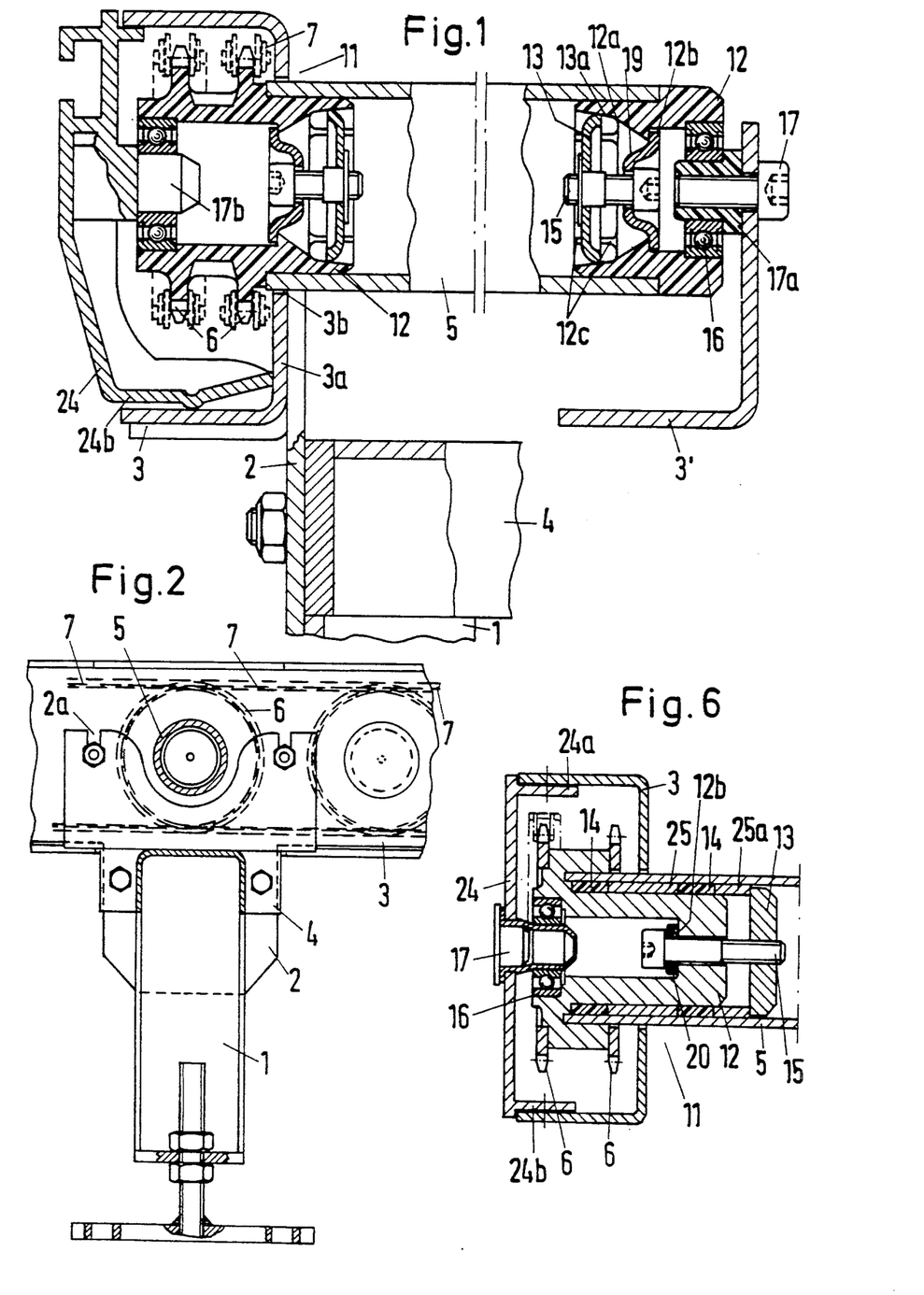
FIG. 1 is a cross sectional view through a roller conveyor train with a longitudinal section through the support roller.
FIG. 2 is side elevational view of the guide of the drive means of the roller conveyor train.
FIG. 6 is a view of a longitudinal section through a second embodiment of a support roller.
Figure 3:
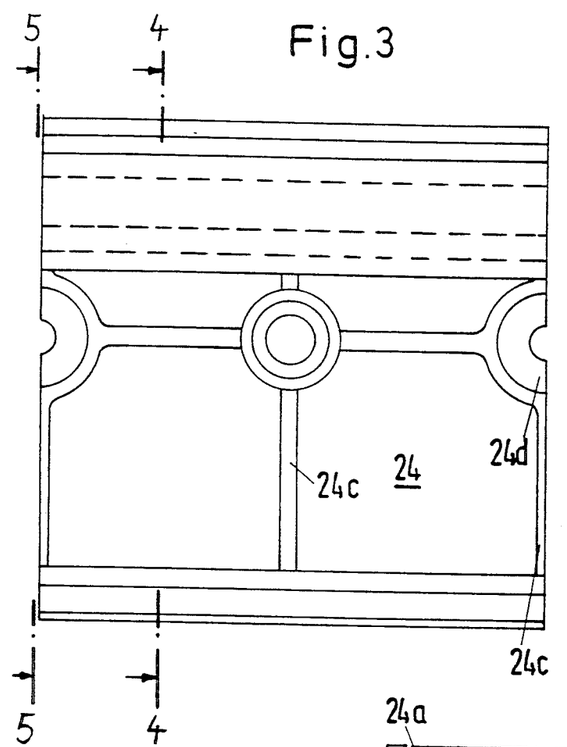
FIG. 3 is a side elevational view of the cover plate of FIG. 1.

A cross section of a roller conveyor train is illustrated in a cross sectional view in FIG. 1 and in a partial view in FIG. 2, seen from the side with supports adjustable for higher height level and with their reinforcement console plates 2 for the side cheeks 3. The side cheeks 3 are connected to each other via cross beams 4. The side cheeks 3 support rollers 5 via axle journals 17, 17b and expanding elements 11. The spreader piece 12 of the left expanding element 11 is furnished with gear wheels 6 for drive transmission pull means 7 disposed next to each other and formed as roller chains or tooth belts, which connect to each other two successively disposed support rollers 5 as illustrated in FIG. 2. The support roller 5 is guided on the drive side through a receiver opening 3b in the web 3a of the U-shape side cheek 3. The side cheek 3' of the other side in axial direction is a simple L-shaped profile.

The spreader piece 12 is made of a thermoplastic material and expands upon pulling of the clamping locking screw 15, which then presses inclined faces 13a of the spreader thrust piece 13 against thrust faces 12a of the spreader piece 12. For a good expansion, the spreader piece 12 is furnished with slots 12c. A thrust collar 19 for the screw or bolt 15 is supported at the thrust abutment 12b of the spreader piece 12.

The support roller 5 is supported on the ride hand side of FIG. 1 via their spreader piece 12 and a bearing 16 on an axial collar 17a of an axle journal 17, where the axial collar 17a is furnished with a thread. The axle journal 17 is guided through the L-shaped side cheek 3'.

Figure 4:
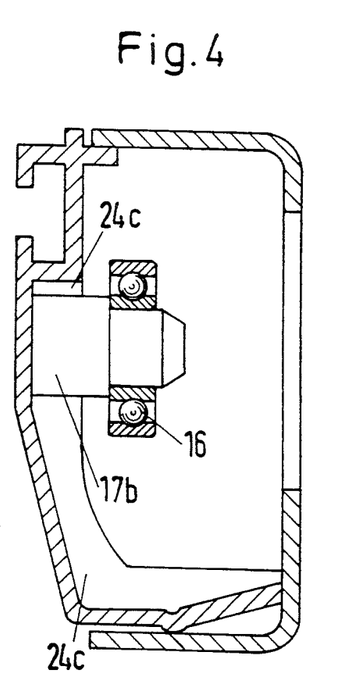
FIG. 4 is a sectional view of the embodiment of FIG. 3 along section line 4—4.
Figure 5:
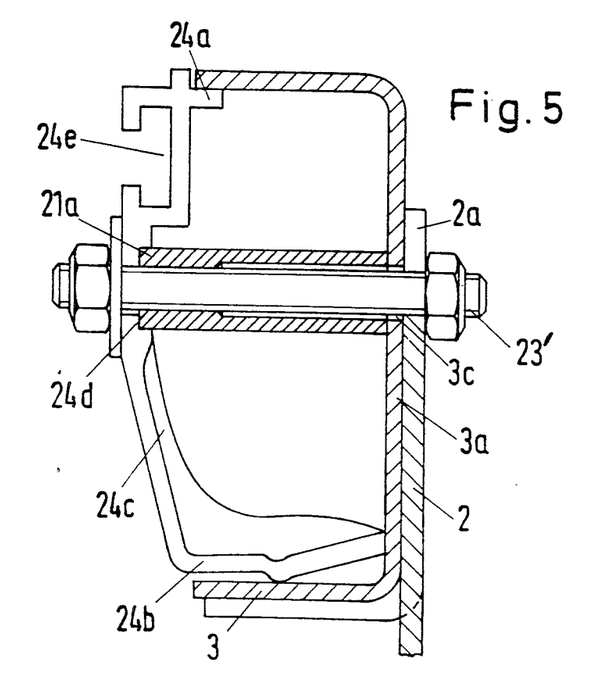
FIG. 5 is a front elevational view of the embodiment of FIG. 3 in a section through a pipe shaped distance spacer along section lines 5—5 of FIG. 3.

The support roller 5 is supported on the left, driven side with the bearing 16 on an axle 17b, which axle 17b is part of the cover plate 24 furnishing the support plate. The cover plate 24 is clamped with two angle legs 24a and 24b into the U-profile-shaped side cheek 3, as is illustrated in FIGS. 4 and 5. Furthermore, FIG. 4 illustrates that the axle 17b is connected via webs 24c with the cover plate 24 and the angle legs 24a and b such that the support function of the cover plate 24 is assured. The webs 24c present at the front ends of the cover plate 24, reinforce recesses 24d for tubular shaped distance spacer pieces 21a, of which one can be recognized in FIG. 5. A screw or bolt running through the distance spacer pieces 21a presses the cover plate 24 against the side cheeks 3. The side cheek 3 is furnished with a bore hole 3c at this web 3a for the screw or bolt 23, which also supports the reinforcement console plate 2. A slot 2a running upwardly allows the pulling off of the reinforcement console 2 after the releasing and disengaging of the screw or bolt 23. The cover plate 24 is further furnished with a slide-in groove 24e for attachment of any parts at the side cheeks.

Figure 10:
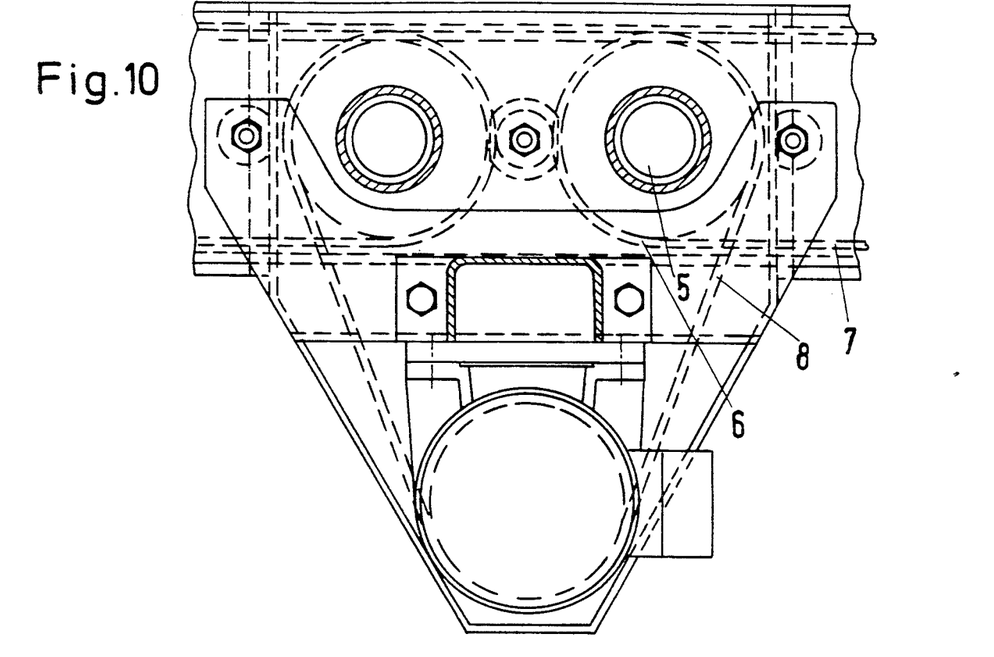
FIG. 10 is a side elevational view of the construction of a drive motor at the roller conveyor drain.

According to the embodiment illustrated in FIG. 6, the expanding element 11 comprises two rings, made of a plastic deformable material, serving as spreader collars 14, which rings fill the space between the metal spreader piece 12 and the support roller 5 upon tensioning of the screw or bolt 15. Metallic intermediate ring 25 is disposed between the two full ring spreader collars 14. A further intermediate ring 25a transfers the pressure, which is exerted via springs 20 and thrust abutment 12b at the thrust piece 12 at the screw 15 supported at the spreader piece 12 from the spreader thrust piece 13 on the spreader collar 14. The spreader piece 12 carries two gear wheels 6 for the drive transmission pull means 7, or, respectively the drive pull means 8 (FIG. 10). The cover plate 24 is supported with its angle legs 24a and 24b at the side cheek 3 and carries an axle journal 17 with bearing 16.

Figure 7:
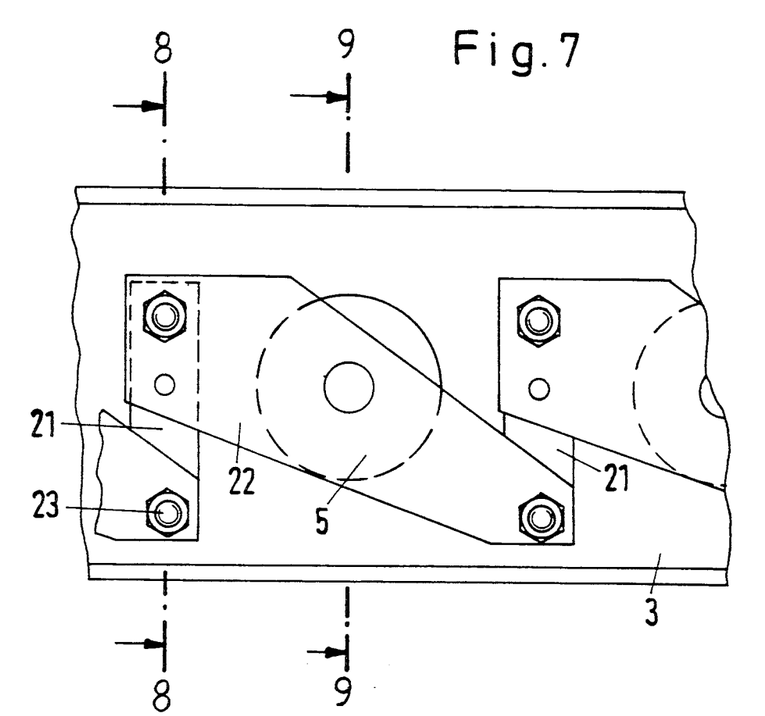
FIG. 7 is side elevational view of the side cheek without cover plate.
Figure 8:
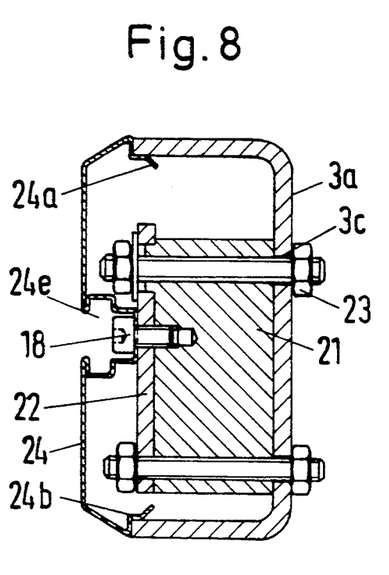
FIG. 8 is a sectional view of the embodiment of FIG. 7 along section line 8—8.
Figure 9:
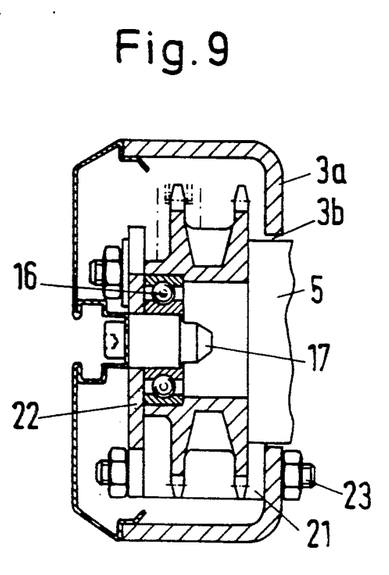
FIG. 9 is a sectional view of the embodiment of FIG. 7 according to section line 9—9.

A partial sectional view of a side cheek is illustrated in FIG. 7 without the cover plate 24 recognizable in FIG. 8. A distance spacer piece 21 is attached at the web 3a of the side cheek 3 by way of screws 23, guided through bore holes 3c. In each case, two distance spacer pieces 21 support a support plate 22. An axle journal 17 for the bearing 16 of the support roller 5 is attached at the support plate 22. The support roller 5 is guided through a receiving recess 36 in the web 3a of the side cheek 3. The cover plate 24 is supported with its angle legs 24a and 24b at the side cheeks 3 and in the slide in groove 24e by a screw 18 at the support plate 22.

Figure 11:
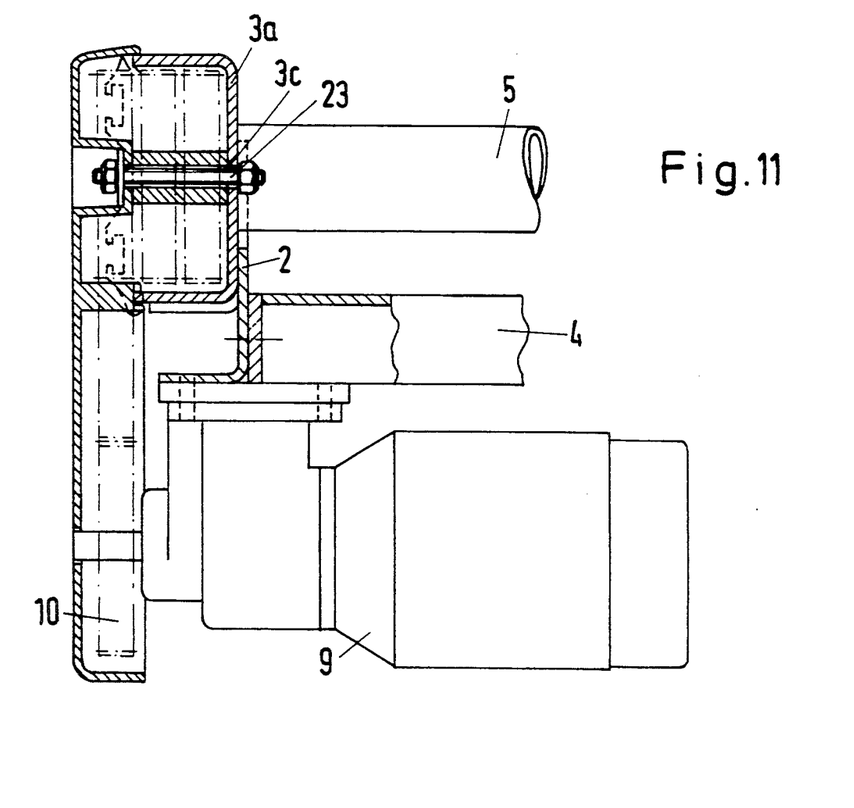
FIG. 11 is a side elevational view of the embodiment of FIG. 10.

FIGS. 10 and 11 illustrate that the bore holes 3c in the web 3a are also suitable for screwing on or bolting on of reinforcement console plates 2 for a drive motor 9. A drive pull means 8 leads to the gear wheels 6 of the support rollers 5 disposed opposite to each other on the two sides of the gear wheels from the drive gear wheel 10 of said drive motor. Additional drive transmission pull means 7 run to gear wheels 6 of the following support rollers 5. This way, all support rollers of a transport conveyor train section are driven by a motor via many pulling means.

Figure 12:
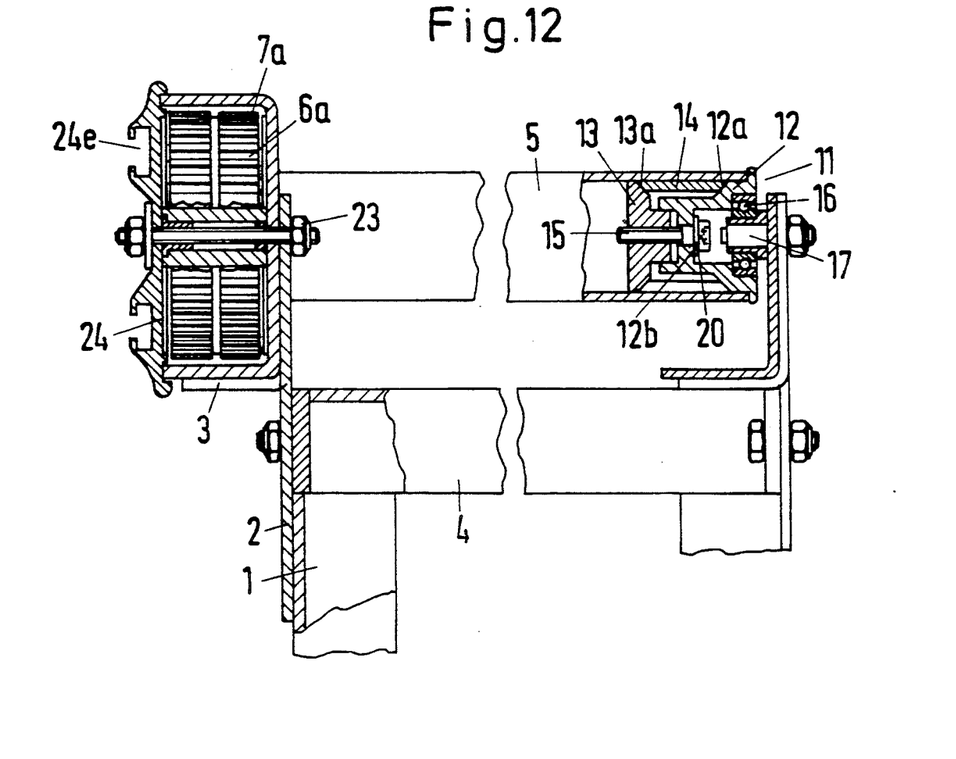
FIG. 12 illustrates a view of an offset cross section through a transport service train.
Figure 13:
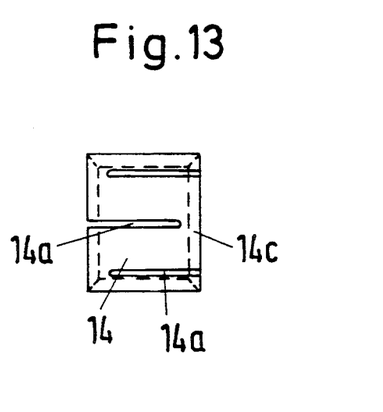
FIG. 13 is a sectional view of a spreader collar according to FIG. 1
Figure 14:
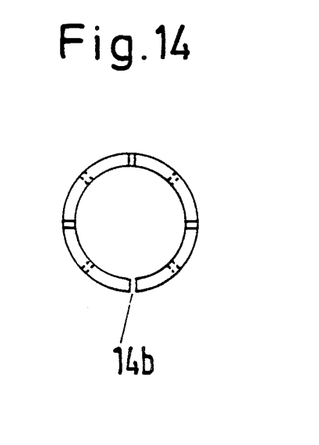
FIG. 14 is a side elevational view of the spreader collar according to FIG. 2.

FIGS. 12 to 14 illustrate an embodiment with a metal expansion piece formed as a spreader piece 12 for a metal spreader collar 14, which is pressed upon rotating of the locking screw or bolt 15 from an inclined thrust face 13a of a spreader thrust piece 13 against an inclined thrust face 12a of the spreader piece 12. Compression springs 20 are disposed between the head of the clamping screw or bolt 15 and a thrust abutment 12b of the spreader piece 12. As illustrated in FIGS. 13 and 14, the spreader collar 14 includes slots 14a reaching from two sides alternatively up to a small connection web 14c. In addition, a spreader collar 14 is furnished with a passage slot 14b extending over the full length of the spreader collar, such that the spreader collar 14 can be expanded without problems, whereby the distance width of the passage slot is expanded from about 3 mm to about 6 mm. The cover plate 24, furnished with slide-in grooves 24e, is supported by screws or bolts 23 at the side cheek 3. In the context of the present invention bolts and screws are designated as attachment elements. The left expanding element supports a gear wheel 6a for tooth belt pulling means 7a.

The support roller 5 itself is supported by height adjustable supports 1 via reinforcement console plates 2 and side cheeks 3. A cross support beam is designated with reference numeral 4. The cross beam 4 connects the oppositely disposed side cheeks 3.

FIG. 12 illustrates further the support of the axle journal 17 in the area of the L-shaped side cheek 3. The axis of the axle journal is in general parallel to the longitudinal extension of the cross beam 4. The cover plate 24 is preferably provided with locking elements for engaging the the side cheek 3 at an upper end section and at a lower end section. The locking means can be for example a groove and a protrusion running in a horizontal direction with the protection onto the horizontal plane of the axis of the axle journal 17 being perpendicular to said axis. The average spacing between the support rollers 5 and the side cheek 3 can be from about 0.01 to 0.1 times the radius of the roller 5 and is preferably from about 0.03 to 0.06 times the radius of the support roller 5. The inner diameter of the spreader piece 12 in the area neighboring the frictionless bearing is preferably larger than the diameter of frictionless bearings such as roller bearing 16. The head of the locking bolt 15 can have a distance from the frictionless bearing supporting the roller, which distance is from about 0.5 to one times the diameter of the roller in an assembled state. The distance between the upper and lower leg of the side cheeks can be from about 1.1 to 3 times and preferably 1.5 to 2.5 times the diameter of the roller. The disposition of the side cheek 3 can be such that its middle line is spaced away from the axis position of the roller by from about 0.2 to 0.3 times the radius of the roller with the position of a side cheek center line being lower than the position of the axis of the axle journal 17. Alternatively, as shown in FIGS. 2 and 6, the axis of the axle journal 17 can be approximately where the center level of the side cheek 3 is disposed.

In short, the support roller 5 is produced with annular bearings at its ends by employing a tube and inserting into the tube ends support structure for annular antifriction bearing elements aligned with the tube axis and for fixedly attaching the anti-friction bearing elements in the tube employing spreader pieces 12. The roller is then or prior to the attaching of the antifriction bearing elements placed within respective openings in two side cheeks. The support roller with the attached anti-friction bearings is force fitted between two cover plates having a structural attachment elements attaching on the one hand to the anti-friction bearing and on the other hand to the respective side cheek.

Preferably, the cover is constructed such that the structural attachment element for the bearing is a tubelike element having an inner opening such that the bolt for expanding and spreading of the spreader elements is easily accessible and can be fastened from the outside. Such a structure is easily obtained by modification and adaptation of the structure of FIG. 6, for example by accessing the screw or bolt head through the interior of the first axle and by covering the access to the screw or bolt head by a second smaller covering closing an opening to the interior of the axle.

It will be understood that each of the elements described above, or two or more together, may also find a useful application in other types of transport system configurations and pulling and wheel mounting procedures differing from the types described above.

While the invention has been illustrated and described as embodied in the context of a roller conveyor train it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A roller conveyor train comprising
support rollers wherein each support roller has a first axial end and a second axial end,
a first bearing inserted and placed at the first axial end,
a second bearing inserted and placed at the second axial end,
a first axle aligned with an axis for supporting said first bearing, and
a second axle aligned with the axis for supporting said second bearing;
a plurality of first cover plates, each cover plate being integral with a respective first axle;
a first side cheek having the first cover plates disposed inside therein, but attached from the outside to the first side cheek, the first side cheek supporting the first cover plates attached from the outside and a respective said first axle for a respective said roller to run on, wherein each support roller protrudes with its first axial end through a respective first receiver opening in a web of the first side cheek and where each first axle is disengageably supported on the first side cheek, and a second side cheek supporting the second axle for each roller to run on, such that the respective second axial end of the support rollers is supported via the second axle attached to the second side cheek.

2. The roller conveyor train according to claim 1, wherein
the first side cheek is furnished with a U-profile and wherein the web of the first side cheek is disposed in a direction toward the support rollers.

3. The roller conveyor train according to claim 2, further comprising
an attachment element;
a second cover plate attached adjacent the first cover plate, wherein the first cover plate and the second cover plate are interconnected in a center area of the attachment element.

4. The roller conveyor train according to claim 2, wherein
said first cover plate includes two angle legs, said two angle legs are supported at flanges of the U-profile of the first side cheek by a clamping function.

5. The roller conveyor train according to claim 1, further comprising
drive gear wheels attached at the first axial end of each support roller protruding through a respective one of said openings of the first side cheek for engaging pull means;
attachment elements; and
a plurality of distance spacer pieces, each distance spacer piece being associated with a respective one of said first cover plates, and, where each first cover plate is connected by way of one of said attachment elements and the distance spacer piece to the first side cheek.

6. The roller conveyor train according to claim 5, wherein the distance spacer pieces are tubular pieces.

7. The roller conveyor train according to claim 6 wherein the distance spacer pieces are made of plastic.

8. Roller conveyor train according to claim 7, wherein
the distance spacer include a threaded insert.

9. The roller conveyor train according to claim 5, wherein
the first side cheek is furnished with a bore hole for a respective one of said attachment elements located between adjacent receiver openings for the support rollers.

10. The roller conveyor train according to claim 9, further comprising
a reinforcement console plate, wherein respective pairs of said bore holes are employed for attachment of said reinforcement console plate, which reinforcement console plate is furnished with a slot for the attachment element reaching up to an upper edge of the reinforcement console plate.

11. The roller conveyor train according to claim 10, further comprising
a support for the roller conveyor train attached at the reinforcement console plate.

12. Roller conveyor train according to claim 10, further comprising
a drive motor for the support roller attached at the reinforcement console plate.

13. Roller conveyor train according to claim 1, further comprising
a drive motor
a gear wheel attached to the support roller;
a drive gear wheel attached to the drive motor;
a drive pull means providing engagement from the drive gear wheel via the gear wheel to the first support roller.

14. Roller conveyor train according to claim 1, further comprising
a drive transmission pull means;
a gear wheel attached to the support roller;
a second support roller;
a neighboring second gear wheel attached to the second support roller, wherein the gear wheel of the support roller and the neighboring gear wheel of the neighboring support roller are disposed next to each other and are connected via the drive transmission pull means to each other.

15. The roller conveyor train according to claim 1, wherein
each of said second axles of the support rollers is furnished as an axle journal and attached at the second side cheek.

16. The roller conveyor train according to claim 1 wherein each support roller further includes an expanding element employed in the second axial end.

17. The roller conveyor train according to claim 16 wherein each support roller further includes a spreader thrust piece attachable to each support roller; and a locking attachment element wherein the expanding element includes a spreader piece made of a plastically deformable material and wherein the spreader piece is deformed directly by the spreader thrust piece with the locking attachment element.

18. The roller conveyor train according to claim 17, wherein the spreader piece is furnished with slots at an end protruding into each support roller and where the spreader piece is furnished with inclined thrust faces for the spreader thrust piece.

19. The roller conveyor train according to claim 16, wherein each support roller further includes a first spreader collar; and
wherein
the expanding element includes a spreader piece for the first spreader collar which expanding element is clamped between a thrust face of the spreader piece and a thrust face of a spreader thrust piece by way of a locking attachment element.

20. The roller conveyor train according to claim 19, wherein the thrust face of the spreader piece and the thrust face of the spreader thrust piece are formed as inclined faces and where the spreader collar is slotted in longitudinal direction.

21. The roller conveyor train according to claim 20, wherein
the spreader collar is furnished alternatingly with slots starting at the two axial ends of the spreader collar, which reach up to a short connecting web.

22. The roller conveyor train according to claim 20, wherein
the spreader collar is furnished with a passage slot extending over a full axial length of the spreader collar.

23. The roller conveyor train according to claim 19, wherein
the first spreader collar is produced out of a plastically deformable material.

24. The roller conveyor train according to claim 23, wherein each support roller further includes
an intermediate ring; and
a second spreader collar produced of a plastically deformable material, wherein the first plastically deformable spreader collar and the second plastically deformable spreader collar are disposed successively behind each other on the spreader piece, and wherein the intermediate ring is disposed between the two plastically deformable spreader collars.

25. The roller conveyor train according to claim 17, further comprising
an inner hollow opening furnished at the first cover plates in the area of one of the first or second axles and the respective bearing for accessing from the outside the locking attachment element without removal of the respective first or second axle.

26. A roller conveyor train comprising
axles;
bearings;
a roller conveyor train;
a support plate;
side cheeks (3);
support rollers (5), where said bearings are inserted and placed at ends of the support rollers (5), wherein the bearings run on said axles (17b) of the roller conveyor train, wherein each of said support rollers (5) protrude with one end through respective receiver openings (3b) in a web (3a) of one of the side cheeks (3) and wherein the support plate (22) is integral with the axles (17b), the axles (17b) being disengagably disposed on the side cheek (3) and wherein the support plate (22) is disposed toward the outside relative to the axles, while the support rollers (5) are supported at the other end via an axle journal (17) at the coordinated side cheek (3).

27. A roller conveyor train comprising
support rollers each support roller having a first axial end and a second axial end;
a first bearing inserted and placed at the first axial end,
a second bearing inserted and placed at the second axial end,
a first axle aligned with an axis for supporting said first bearing, and
a second axle aligned with the axis for supporting said second bearing;
a support plate integral with the first axle;
a first side cheek of the roller conveyor train having the support plate disposed inside therein, but attached from the outside to the first side cheek, the first side cheek supporting the support plate attached from the outside and the first axle for the roller to run on, wherein the support rollers protrude with their first axial end through respective receiver openings in a web of the first side cheek and where the first axle is disengageably supported on the first side cheek;
a second side cheek of the roller conveyor train supporting the second axle for the rollers to run on, such that the second axial end of each support roller is supported via the second axle (17) attached to the second side cheek.

28. The roller conveyor train according to claim 27, wherein
the first side cheek (3) is furnished with a U-profile and wherein the web of the first side cheek is disposed in a direction toward the support rollers (5).

29. The roller conveyor train according to claim 27, further comprising
drive gear wheels attached at the first axial end of each support roller protruding through a respective one of said openings of the first side cheek for engaging pull means;
attachment elements; and a plurality of distance spacer pieces, wherein each support plate is connected by way of a corresponding one of the attachment elements and distance spacer pieces to the side cheek.

30. The roller conveyor train according to claim 29, wherein
the distance spacer pieces are tubular pieces.

31. The roller conveyor train according to claim 30, wherein
the distance spacer pieces are made of plastic.

32. The roller conveyor train according to claim 31, wherein
the distance spacer pieces include a threaded insert.

33. The roller conveyor train according to claim 29, wherein
the first side cheek is furnished with a bore hole for a respective one of said attachment elements located between adjacent receiver openings for the support rollers.

34. The roller conveyor train according to claim 33, further comprising
a reinforcement console plate, wherein respective pairs of said bore holes are employed for attachment of said reinforcement console plate, which reinforcement console plate is furnished with a slot for the attachment element reaching up to an upper edge of the reinforcement console plate.

35. The roller conveyor train according to claim 27, further comprising
a drive motor;
a gear wheel attached to the support roller;
a drive gear wheel attached to the drive motor;
a drive pull means providing engagement from the drive gear wheel via the gear wheel to the first support roller.

36. The roller conveyor train according to claim 27, further comprising
a drive transmission pull means;
a gear wheel attached to the support roller;
a second support roller;
a second gear wheel attached to the second support roller,
wherein the gear wheel of the support roller and the neighboring gear wheel of the neighboring support roller are disposed next to each other and are connected via the drive transmission pull means to each other.

37. The roller conveyor train according to claim 27, wherein
each of said second axles (17) of the support rollers is furnished as an axle journal and attached at the second side cheek.

38. The roller conveyor train according to claim 27, wherein
each of the second axles (17) of the support rollers (5) is furnished as an axle journal and is supported by the support plate.

39. The roller conveyor train according to claim 27, wherein
each of the second axles of the support rollers is furnished as an axle journal and is supported by a cover plate.

40. The roller conveyor train according to claim 27, wherein each support roller further includes an expanding element employed in the second axial end.

41. The roller conveyor train according to claim 40, wherein each support roller further includes a spreader thrust piece attachable to the support roller;
a locking attachment element wherein the expanding element includes a spreader piece made of a plastically deformable material and wherein the spreader piece is deformed directly by the spreader thrust piece with the locking attachment element.

42. The roller conveyor train according to claim 41, wherein
the spreader piece is furnished with slots at an end protruding into the support roller and where the spreader piece is furnished with inclined thrust faces for the spreader thrust piece.

43. The roller conveyor train according to claim 40, wherein each support roller further includes a first spreader collar; wherein
the expanding element (11) includes a spreader piece (12) for the first spreader collar (14) which expanding element (11) is clamped between a thrust face (12a) of the spreader piece (12) and a thrust face (13a) of a spreader thrust piece (13) by way of a locking attachment element (15).

44. The roller conveyor train according to claim 43, wherein
the thrust face of the spreader piece and the thrust face of the spreader thrust piece are formed as inclined faces and where the spreader collar is slotted in longitudinal direction.

45. The roller conveyor train according to claim 44, wherein
the spreader collar is furnished alternatingly with slots starting at the two axial ends of the spreader collar, which reach up to a short connecting web.

46. The roller conveyor train according to claim 44, wherein
the spreader collar is furnished with a passage slot extending over a full axial length of the spreader collar.

47. The roller conveyor train according to claim 43, wherein
the first spreader collar is produced out of a plastically deformable material.

48. The roller conveyor train according to claim 47, wherein each support roller further includes
an intermediate ring;
a second spreader collar produced of a plastically deformable material, wherein the first plastically deformable spreader collar and the second plastically deformable spreader collar are disposed successively behind each other on the spreader piece, and wherein the intermediate ring is disposed between the two plastically deformable spreader collars.

49. The roller conveyor train according to claim 41, further comprising
an inner hollow opening in one of the first or second axles and the respective bearing for accessing from the outside the locking attachment element without removal of the respective axle.

50. A roller conveyor train comprising
axles;
bearings;
a roller conveyor train;
a support plate;
support rollers (5), where said bearings are inserted and placed at ends of the support rollers (5), wherein the bearings run on axles (17b), wherein the axles are supported at side cheeks (3) of roller support axles, wherein the support axles (17b) are supported at side cheeks of the roller conveyor train, wherein said support rollers (5) protrude with one end through receiver openings (3b) in a web (3a) of one of the side cheeks (3) and a support plate (22) integral with the axle (17b) wherein the axle (17b) is disengagably disposed on the side cheek (3) on the support plate (22) and wherein the side cheeks are disposed toward the outside relative to the axle, while the support rollers (5) are supported at the other end via an axle journal (17) at the coordinated side cheek (3).

* * * * *